United States Patent [19]

Oyama et al.

[11] Patent Number: 5,441,319
[45] Date of Patent: Aug. 15, 1995

[54] AUTOMOTIVE BUMPER STAY STRUCTURE

[75] Inventors: Masaru Oyama; Noriaki Masuta, both of Saitama, Japan

[73] Assignee: Honda Giken Kogyo Kabushiki Kaisha, Tokyo, Japan

[21] Appl. No.: 263,661

[22] Filed: Jun. 22, 1994

[30] Foreign Application Priority Data

Aug. 31, 1993 [JP] Japan ............................... 5-240367

[51] Int. Cl.6 ............................................ B60R 19/24
[52] U.S. Cl. .................................... 293/155; 293/102
[58] Field of Search ............... 296/102, 120, 121, 155; 248/300

[56] References Cited

U.S. PATENT DOCUMENTS

| | | | |
|---|---|---|---|
| 4,955,570 | 9/1990 | Benz | 248/300 |
| 5,071,500 | 12/1991 | Kumagai et al. | 293/120 X |
| 5,271,650 | 12/1993 | Fukuhara | 293/155 X |

FOREIGN PATENT DOCUMENTS

| | | | |
|---|---|---|---|
| 2513024 | 10/1976 | Germany | 293/121 |
| 18047 | 1/1984 | Japan | 293/102 |

*Primary Examiner*—Dennis H. Pedder
*Attorney, Agent, or Firm*—Armstrong, Westerman, Hattori, McLeland & Naughton

[57] ABSTRACT

The bumper stay comprises a stay main body consisting of a channel member having a vertical axial line and a reinforcement member fixedly received in the stay main body and adapted to be secured to the bumper beam by way of flanges thereof. The stay main body comprises a closed end adapted to be fixedly secured to a vehicle body and an open end facing a bumper beam. A pair of U-shaped middle parts each having a horizontal axial line are provided between the flanges of the reinforcement member, and an intermediate abutting surface is defined between the U-shaped middle parts, the intermediate abutting surface abutting a part of the bumper beam. Thus, the closed end of the stay main body can present a large contact area between the bumper stay and the vehicle body while the reinforcement member can provide a large area of contact between the bumper stay and the bumper beam. By suitably combining the stay main body and the reinforcement member, a favorable energy absorbing property and a necessary mechanical strength can be achieved without complicating the fabrication process.

7 Claims, 3 Drawing Sheets

AUTOMOTIVE BUMPER STAY STRUCTURE

TECHNICAL FIELD

The present invention relates to a bumper stay structure for a vehicle such as an automobile, and in particular to a bumper stay structure for securing a bumper beam to a vehicle body.

BACKGROUND OF THE INVENTION

The front and rear ends of an automobile are each provided with a bumper for reducing the impact when the automobile is hit from the front or behind. Typically, a bumper comprises a bumper face made of synthetic resin material, a bumper beam for distributing the load from the impacts applied to the bumper face and reinforcing the bumper, an absorber member interposed between the bumper face and the bumper beam for absorbing the impacts applied to the bumper face, and a pair of bumper stays which secure the bumper beam to the vehicle body. A conventional bumper stay structure is illustrated in FIG. 3 in a simplified manner.

According to this conventional bumper structure, because the area of contact between the bumper stay 32 and the bumper beam 33 is solely provided by the flanges 34 provided in the bumper stay 32, a substantial load concentrates on these flanges 34 when an impact is applied to the bumper beam 33 as indicated by the arrow. Therefore, according to this conventional structure, it is necessary to reinforce the bumper stay 32 by using reinforcing members having complicated shapes and/or to increase the size of the flanges. In either case, the bumper stay tends to be unacceptably complex and bulky, and the fabrication process becomes highly complicated.

BRIEF SUMMARY OF THE INVENTION

In view of such problems of the prior art, a primary object of the present invention is to provide a bumper stay structure which is simple in structure and provides a favorable capability to spread the load applied to the bumper beam.

A second object of the present invention is to provide a bumper stay structure which is capable of absorbing a large amount of energy in case of a crash.

A third object of the present invention is to provide a bumper stay structure which is easy to assemble.

These and other objects of the present invention can be accomplished by providing a automotive bumper stay structure generally made of sheet metal for mounting a bumper beam to a vehicle body, comprising: a stay main body consisting of a channel member comprising a closed end adapted to be fixedly secured to a vehicle body and an open end facing a bumper beam; and a reinforcement member fixedly received in the stay main body and adapted to be secured to the bumper beam.

Thus, the closed end of the stay main body can present a large contact area between the bumper stay and the vehicle body while the reinforcement member can provide a large area of contact between the bumper stay and the bumper beam. These large contact areas allow the load applied to the bumper beam to be spread evenly over the entire bumper stay structure, and local concentration of stress in the bumper stay can be effectively avoided. Furthermore, by suitably combining the stay main body and the reinforcement member, a favorable energy absorbing property and a necessary mechanical strength can be achieved without complicating the fabrication process.

Preferably, the channel member has an axial line extending in a first direction, for instance in the vertical direction, and the reinforcement member comprises at least a pair of flanges adapted to be secured to the bumper beam, and at least one U-shaped middle part located between the flanges and having an axial line extending in a second direction, for instance in the horizontal direction, substantially perpendicular to the first direction. The mutually perpendicular arrangement of the two channel shaped members forming the stay main body and the reinforcement member allows a structurally favorable combination of these parts without complicating the assembling process.

According to a preferred embodiment of the present invention, a pair of U-shaped middle parts are provided between the flanges of the reinforcement member, and an intermediate abutting surface is defined between the U-shaped middle parts, the intermediate abutting surface abutting a part of the bumper beam when the latter is secured to the flanges of the reinforcement member. Thus, the reinforcement member can present a large amount of crushable parts, and, hence, can absorb a large amount of energy.

To further increase the mechanical strength of the bumper stay and the energy absorbing capability of the bumper stay, the U-shaped middle parts may be at least partly provided with a rib along a side edge thereof, and the U-shaped middle parts may be at least partly provided with a bead extending substantially perpendicularly to the axial line extending in the second direction.

To increase the contact area between the bumper stay and the bumper beam, the stay main body may be provided with a pair of flanges at the open end thereof, and the flanges of the reinforcement member may at least partly overlap the flanges of the stay main body. Preferably, the intermediate abutting surface may be additionally provided with another flange which at least partly overlaps the flanges of the stay main body.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
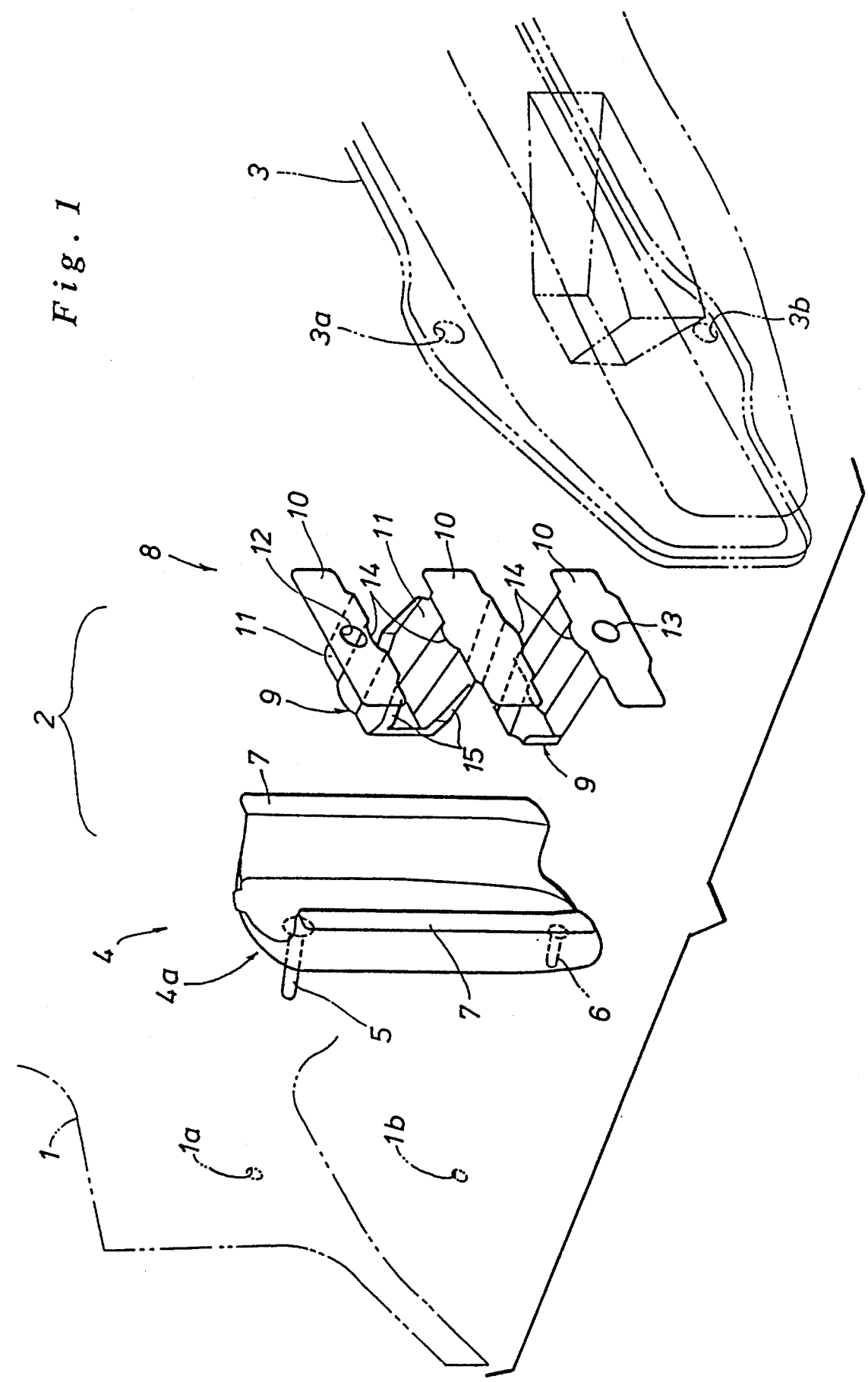
FIG. 1 is an exploded perspective view of an embodiment of the bumper stay structure according to the present invention.
Figure 2:
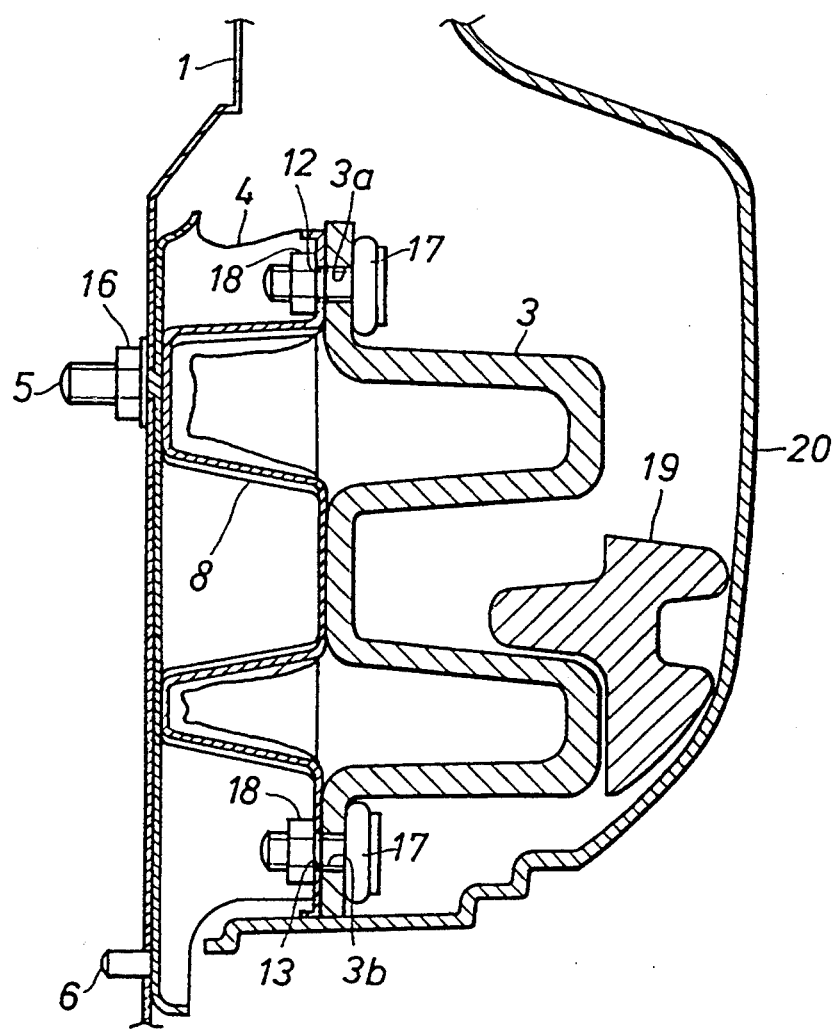
FIG. 2 is a sectional side view of the bumper stay structure.
Figure 3:
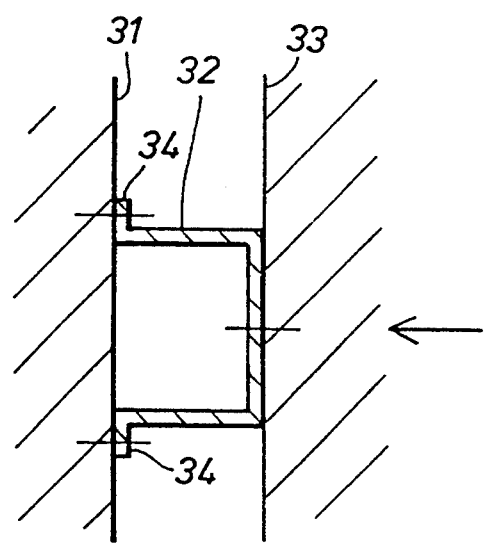
FIG. 3 is a simplified sectional side view of a conventional bumper stay structure.

FIG. 1 is an exploded perspective view of an embodiment of the bumper stay structure according to the present invention. A bumper beam 3 indicated by dotted lines is mounted on a panel 1 at a rear end of a vehicle body also indicated by dotted line, via a bumper stay 2. The bumper stay 2 consists of a stay main body 4 and a reinforcement member 8.

The stay main body 4 is made of sheet metal such as steel plate, and generally consists of a channel member having an axial line extending vertically and a C-shaped horizontal cross section. Its closed end 4a is provided with a stud bolt 5 and a positioning pin 6 extending toward the vehicle body panel 1 from upper and lower positions thereof. The open end of the stay main body 4 is provided with an external lateral flanges 7 along two side edges thereof.

The reinforcement member 8, likewise made of sheet metal such as steel plate, is fixedly secured inside the stay main body 4 in its assembled state, and is generally W-shaped when viewed from a side. More specifically, the reinforcement member 8 comprises pair of planar portions 9 abutting the inner surface of the stay main body 4, three planar portions 10 abutting the opposing surfaces of the bumper beam 3, and connecting portions 11 connecting these planar portions 9 and 10. The planar portions 10 facing the bumper beam 3 are formed as flanges which are laterally broader than the planar portions 9 and the connecting portions 11 so as to overlap the flanges 7 of the stay main body 4. In this embodiment, the lateral expanse of the flanges 7 of the stay main body 4 is substantially same as that of the planar portions 10.

The upper and lower planar portions 10 facing the bumper beam 2 are each centrally provided with an opening 12 or 13, and the connecting portions 11 are each centrally provided with a bead 14 extending between adjacent planar portions 9 and 10. Additionally, the side edges of the planar portions 9 and the connecting portions 11 are provided with integral ribs 15. These beads 14 and the ribs 15 contribute to the overall mechanical strength and rigidity of the bumper stay 2.

The stay main body 4 and the reinforcement member 8 are integrally joined together by spot welding the planar portions 9 to the bottom portion of the stay main body 4, and the planar portions 10 to the flanges 7 of the stay main body 4.

Now the process of assembling the bumper stay 2 is described in the following.

First of all, the bumper stay 2 consisting of the stay main body 4 and the reinforcement member 8 joined together is secured to the vehicle body panel 1 by fitting the stud bolt 5 and the positioning pin 6 into corresponding openings 1a and 1b provided in the vehicle body panel 1, and engaging a threaded nut 16 with the stud bolt 5. Then, a pair of threaded bolts 17 are passed through holes 3a and 3b provided in upper and lower parts of the bumper beam 3 and the holes 12 and 13 of the reinforcement member 8, and threaded nuts 18 are engaged with the threaded bolts 17 so as to secure the bumper beam 3 to the bumper stay 2. The absorber member 19 is placed in a suitable part of the exterior of the bumper stay 2, and the bumper face 20 is placed over the absorber member 19.

Because the contact surface between the bumper stay 2 and the vehicle body panel 1 is defined by the closed end 4a of the stay main body 4, it can be expanded without increasing the overall size of the bumper stay 2 as compared to the conventional structure. Furthermore, the reinforcement member 8 is provided with planar portions 10 which are adapted to abut the opposing surfaces of the bumper beam 3 and provided with a relatively large area, the impulsive load which may be applied to the bumper beam 3 can be evenly supported by the bumper stay 2. Furthermore, the positioning of the planar portions 10 are adapted to the shape of the bumper beam 3.

Thus, the bumper stay 2 of the present invention can withstand a greater impulsive load, and absorb more energy than the conventional structure without increasing the overall size of the bumper stay.

Although the present invention has been described in terms of a specific embodiment thereof, it is possible to modify and alter details thereof without departing from the spirit of the present invention.

What we claim is:

1. An automotive bumper stay structure generally made of sheet metal for mounting a bumper beam to a vehicle body, comprising:
    a stay main body consisting of a substantially U-shaped channel member defining a groove elongated vertically and substantially open at top and bottom and having a closed end fixedly secured to a vehicle body and an open end facing a bumper beam; and
    a reinforcement member having at least one substantially U-shaped middle part defining a groove elongated horizontally and substantially open at left and right ends and fixedly received in said stay main body and secured to said bumper beam.

2. An automotive bumper stay structure according to claim 1, wherein said reinforcing member comprises at least a pair of flanges for securing to said bumper beam, and at least one said substantially U-shaped middle part being located between said flanges.

3. An automotive bumper stay structure according to claim 2, wherein a pair of said substantially U-shaped middle parts are provided between said flanges of said reinforcement member, and an intermediate abutting surface is defined between said substantially U-shaped middle parts, said intermediate abutting surface abutting a part of said bumper beam when the latter is secured to said flanges of said reinforcement member.

4. An automotive bumper stay structure according to claim 3, wherein said stay main body is provided with a pair of flanges at said open end thereof, and said flanges of said reinforcement member at least partly overlap said flanges of said stay main body.

5. An automotive bumper stay structure according to claim 4, wherein said intermediate abutting surface is also provided with another flange which at least partly overlaps said flanges of said stay main body.

6. An automotive bumper stay structure according to claim 3, wherein said U-shaped middle parts are at least partly provided with a rib along a side edge thereof.

7. An automotive bumper stay structure according to claim 3, wherein said U-shaped middle parts are at least partly provided with a bead extending substantially perpendicularly to said groove.

* * * * *